E. C. SCHMELZKOPF.
CHUCK.
APPLICATION FILED AUG. 18, 1911.
1,025,162.
Patented May 7, 1912.
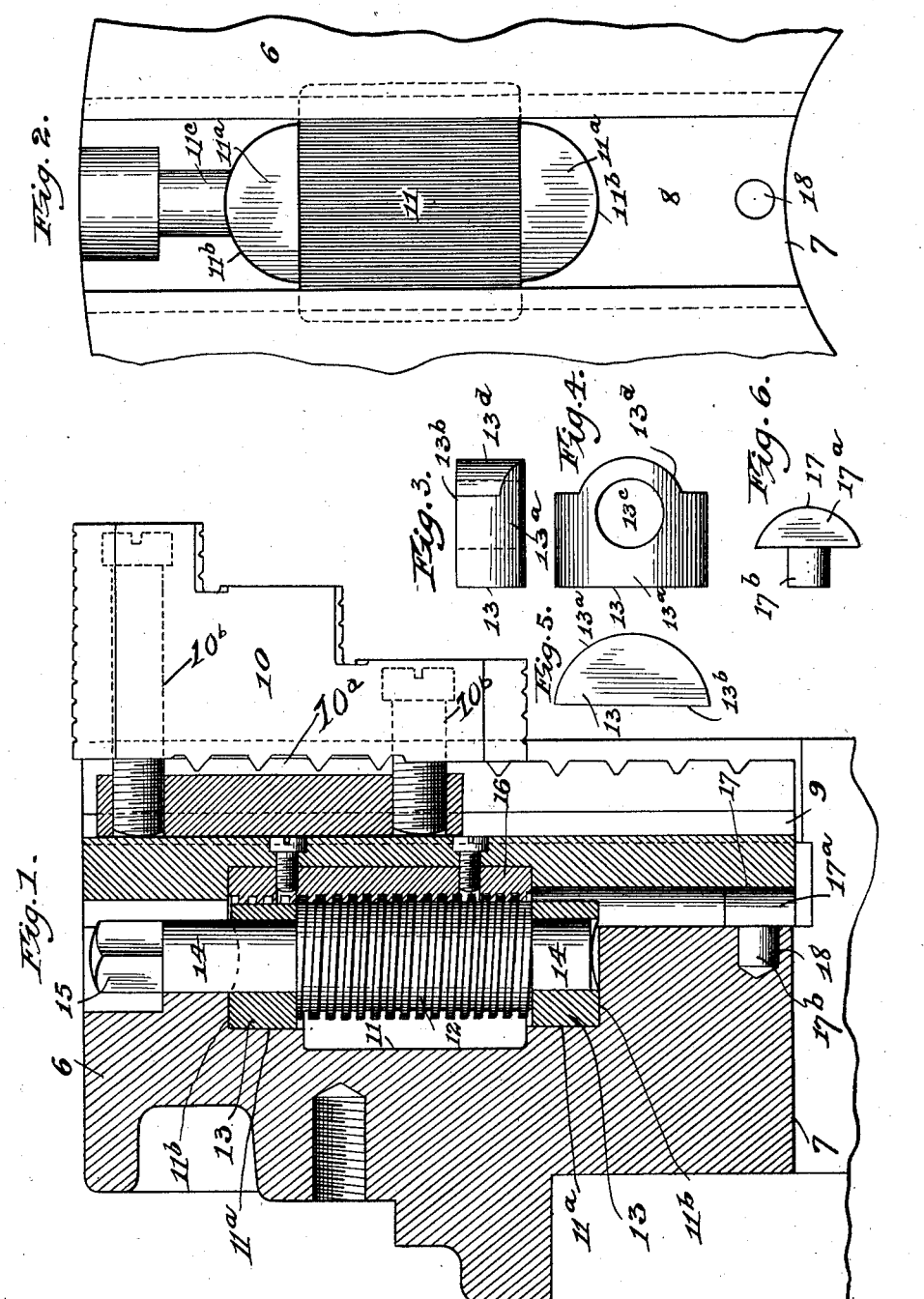

UNITED STATES PATENT OFFICE.

EDWARD C. SCHMELZKOPF, OF MADISON, WISCONSIN, ASSIGNOR TO GISHOLT MACHINE COMPANY, OF MADISON, WISCONSIN, A CORPORATION OF WISCONSIN.

CHUCK.

1,025,162.      Specification of Letters Patent.      Patented May 7, 1912.

Application filed August 18, 1911. Serial No. 644,783.

*To all whom it may concern:*

Be it known that I, EDWARD C. SCHMELZKOPF, a citizen of the United States, residing at Madison, in the county of Dane and State of Wisconsin, have invented certain new and useful Improvements in Chucks, of which the following is a specification.

This invention relates to improvements in lathe chucks, the same being in part applicable to the face-plate jaws of boring mills; and the invention consists mainly in a novel end thrust-bearing for the feed screws of the jaws, which shall afford an increased amount of end bearing as compared with that found in the usual chucks of this type; which shall be self-centering; which shall facilitate the machining of the ends of the slot or chamber which receive the end thrust-bearings; which are interchangeable; which are easily and simply made from a round rod; and which permit the easy removal of the bearings and screw for cleaning.

The invention will be readily understood from the illustration shown in the accompanying drawings, in which—

Figure 1 is a vertical section through a portion of the chuck substantially in the plane of the median radial line of one of the slots of the sliding jaws, the jaw itself appearing in elevation. Fig. 2 is a front plan view of the portion of the chuck shown in Fig. 1, with the jaw removed. Figs. 3, 4, and 5 are detail views of the end thrust bearings. Fig. 6 is a detail elevation of a dust-excluding plug forming one feature of the invention.

Referring to the drawings, 6 designates the chuck-body of the usual construction, having the central axial opening 7 for the spindle, and the radial undercut slots 8 each adapted to receive a jaw-base 9 to which latter is adjustably secured the jaw 10 by a clamping gib $10^a$ and screws $10^b$, all as usual in chucks of this type.

The chuck-body 6 is cast with a chamber 11 in the bottom of the slot 8 to receive the body portion of the adjusting screw 12. In accordance with my invention the end portions of the chamber 11 are milled or bored to present approximately semi-circular seats $11^a$ for the end-thrust bearings 13 which are seated therein; these seats, as best shown in Fig. 2, having approximately semi-circular outer walls $11^b$ constituting abutments for the approximately semi-circular outer walls of the bearings 13. Beyond the outer seat $11^a$ is a semi-circular slot $11^c$ in which rests the neck 14 of the screw 12, the latter having the usual squared end 15 forming a wrench-hold for the chuck-wrench. On the under side of the jaw-base 9 is a detachable half nut 16, preferably made of hardened metal, and engaging the screw 12.

The end thrust of the screw 12 in either direction is taken by the bearings 13 which, as shown, are each formed with an outer substantially semi-cylindric face $13^a$ engaging the wall $11^b$ of the bearing seat $11^a$, and an inner flat face $13^b$ that is engaged by the end of the body of the screw. Each bearing is also formed with a hole $13^c$ through which the neck 14 of the screw passes. These end bearings may be made from a round bar of steel, in the following manner. A piece is first cut off of a length corresponding to the height of the bearing to be formed. This piece is then suitably chucked or held in a jig; and is sawed lengthwise in two pieces forming the inner flat face $13^b$; this flat face is then milled true to the semi-cylindrical face $13^a$. The top or end is then milled to form the substantially semi-circular top portion $13^d$, and lastly the whole is bored being held in a jig to form the bearings $13^c$ for the neck portions 14 of the screw.

From the foregoing it will be seen that not only do the bearings 13 afford bearings for substantially the entire surfaces of the ends of the screw-body 12, and are self-centering or self-alining with relation to the necks of the screw, but they are easily and cheaply made from a plain round bar of steel; and the substantially semi-circular or semi-cylindrical form of their outer walls facilitates and cheapens the manufacture of the chuck-body especially with reference to the formation of the end thrust bearing seats $11^a$, which latter, as above stated, can be very easily and cheaply machined. The jaw and jaw base can be removed by simply applying a wrench to the squared end 15 of the screw and screwing the jaw base out from the outer end of its channel, or the jaw alone can be removed from the jaw base by removing the screws $10^b$ which connect it to the clamping gib. When the chuck jaw and base have thus been removed, by applying the wrench to the squared end 15 of the screw the latter and the two end thrust bearings can be bodily lifted from their seats.

Another feature of the invention resides in the provision, at the inner end of the base of the slot 12, of a dust-excluding plug 17, this latter comprising a head 17$^a$ of substantially semi-cylindrical form adapted to slidably fit the concave inner surface of the jaw-base 9, and a shank or stem 17$^b$ which engages a socket 18 formed in the base of the slot 8, to receive said shank or stem. This plug 17, formed and located as described, prevents dirt from working into the threads on the screw 12 and half nut 16, thereby making the jaw practically dust-proof.

Although I have shown and described my invention as applied to the chuck of a lathe, it will be understood that the same is applicable to equal advantage to the independent face-plate jaws of a boring mill, since the jaw and jaw-adjusting mechanism of such jaws is substantially like that of a four-jaw independent chuck, and is subject to substantially the same wear and other influences.

I claim—

1. The combination with a chuck-body formed with a chamber to receive the adjusting screw of the chuck-jaw, said chamber having rounded concave end walls, of an adjusting screw in said chamber having a body portion and reduced end or neck portions, and end-thrust bearings for said adjusting screw formed with flat inner faces engaging the ends of the screw-body and rounded convex outer faces engaging the rounded concave end walls of the screw chamber, substantially as described.

2. The combination with a chuck-body formed with a chamber to receive the adjusting screw of the chuck-jaw, said chamber having rounded concave end walls, of an adjusting screw in said chamber having a body portion and reduced end or neck portions, and end-thrust bearings for said adjusting screw formed with flat inner faces engaging the ends of the screw-body, rounded convex outer faces engaging the rounded concave end walls of the chamber, and transverse apertures receiving and forming bearings for the neck portions of the screw, substantially as described.

3. The combination with a chuck-body having a guide slot for the chuck-jaw, of a chuck-jaw slidably mounted in said slot, and a dust-excluding plug mounted on the inner end of the base of the slot and engaging the inner side of the chuck-jaw, substantially as described.

4. The combination with a chuck-body having a guide slot for the chuck-jaw, the inner end of the base of said slot being provided with a socket, of a chuck-jaw slidably mounted in said slot, and a dust-excluding plug having a stem or shank portion fitted to said socket and a head portion engaging the inner side of the chuck-jaw, substantially as described.

EDWARD C. SCHMELZKOPF.

Witnesses:
M. E. GOECKS,
W. L. MILLER.

---

Copies of this patent may be obtained for five cents each, by addressing the "Commissioner of Patents, Washington, D. C."